United States Patent
Liu et al.

(10) Patent No.: US 11,044,680 B2
(45) Date of Patent: Jun. 22, 2021

(54) POWER CONTROL ENHANCEMENT FOR RANDOM ACCESS

(71) Applicant: Telefonaktiebolaget LM Ericsson (publ), Stockholm (SE)

(72) Inventors: Jinhua Liu, Beijing (CN); Jan Christoffersson, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/916,717

(22) Filed: Jun. 30, 2020

(65) Prior Publication Data

US 2020/0329436 A1  Oct. 15, 2020

Related U.S. Application Data (63) Continuation of application No. 16/289,116, filed on Feb. 28, 2019, now abandoned, which is a
(Continued)

(30) Foreign Application Priority Data

Mar. 24, 2017  (WO) ................ PCT/CN2017/078054

(51) Int. Cl.
*H04W 52/32* (2009.01)
*H04W 52/26* (2009.01)
(Continued)

(52) U.S. Cl.
CPC ....... *H04W 52/325* (2013.01); *H04W 52/265* (2013.01); *H04W 52/281* (2013.01);
(Continued)

(58) Field of Classification Search
CPC ............. H04W 52/325; H04W 52/265; H04W 74/004; H04W 74/00833; H04W 74/0833; H04W 52/281
See application file for complete search history.

(56) References Cited

U.S. PATENT DOCUMENTS

| 2004/0147274 A1 | 7/2004 | Khawand et al. |
| 2010/0067467 A1 | 3/2010 | Cho et al. |
| (Continued) | | |

FOREIGN PATENT DOCUMENTS

| CN | 102781086 A | 11/2012 |
| CN | 105704833 A * | 6/2016 |
| (Continued) | | |

*Primary Examiner* — Yuwen Pan
*Assistant Examiner* — Angelica M Perez
(74) *Attorney, Agent, or Firm* — Murphy, Bilak & Homiller, PLLC (57) ABSTRACT

According to an aspect, a method for communications includes determining whether a random access procedure is initiated for a first service that requires a more reliable random access than a second service. In response to the determination that the random access procedure is initiated for the first service, respective transmit power for one or more messages of the random access procedure is estimated based at least in part on parameter settings for the first service. The messages are transmitted to a network node during the random access procedure by using the respective transmit power.

8 Claims, 3 Drawing Sheets

Related U.S. Application Data continuation of application No. PCT/CN2018/076509, filed on Feb. 12, 2018.

(51) Int. Cl.
*H04W 52/28* (2009.01)
*H04W 52/50* (2009.01)
*H04W 74/00* (2009.01)
*H04W 74/08* (2009.01)

(52) U.S. Cl.
CPC ......... *H04W 52/50* (2013.01); *H04W 74/004* (2013.01); *H04W 74/0833* (2013.01)

(56) References Cited

U.S. PATENT DOCUMENTS

| | | |
|---|---|---|
| 2012/0275305 A1 | 11/2012 | Lin |
| 2015/0023281 A1* | 1/2015 | Wu .................. H04W 72/0473 370/329 |
| 2017/0290052 A1* | 10/2017 | Zhang .................. H04L 1/1896 |
| 2018/0042050 A1 | 2/2018 | Kim et al. |
| 2018/0167979 A1 | 6/2018 | Guo et al. |

FOREIGN PATENT DOCUMENTS

| | | |
|---|---|---|
| CN | 105704833 A | 6/2016 |
| JP | 6006436 B2 | 9/2016 |
| WO | 2010107354 A1 | 9/2010 |
| WO | 2015145317 A1 | 10/2015 |
| WO | 2016119966 A1 | 8/2016 |
| WO | 2016129970 A1 | 8/2016 |

\* cited by examiner

POWER CONTROL ENHANCEMENT FOR RANDOM ACCESS

RELATED APPLICATIONS

This application is a continuation of U.S. application Ser. No. 16/289,116 filed 28 Feb. 2019, which is a continuation of and claims the benefit of and priority to Application No. PCT/CN2018/076509 having an effective filing date of 12 Feb. 2018, which claims the benefit of and priority to "Provisional" Application No. PCT/CN2017/078054, filed 24 Mar. 2017. The entire contents of each aforementioned application is incorporated herein by reference.

TECHNICAL FIELD

The present disclosure generally relates to communications, and more specifically, relates to wireless communications.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performances. To meet dramatically increasing traffic requirements, one interesting option for communication technique development is to support various services with different quality of service (QoS) requirements via a common network. In next generation communication systems such as 5G or new radio (NR), radio devices are expected to be able to establish sessions for different types of services by initiating random access (RA). Different services, such as ultra-reliable lower latency communication (URLLC), enhanced mobile broadband (eMBB), massive machine type communication (MTC) and the like, usually have different latency requirements. The user experience may be impacted due to the latency of the RA.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

A wireless communication network such as NR may be able to support various types of services via a common network. Some services such as URLLC may have tight requirements with respect to reliability and delay. If the same parameter settings are applied for all services, the radio connection setup of a service with more strict requirements for the reliable RA may experience the same large delay as other services. Therefore, it may be desirable to reduce the delay for the service requiring more reliable RA.

The present disclosure proposes a solution of power control enhancement for RA, which may enable a transmit power boost to be applied for RA message transmissions by a terminal device for a service with higher reliability requirements, so that the terminal device can access to a network node for this service with high success rate and short delay.

According to a first aspect of the present disclosure, there is provided a method implemented at a radio device. The radio device may comprise a terminal device. The method may comprise determining whether a RA procedure is initiated for a first service which requires a more reliable RA than a second service. In response to the determination that the RA procedure is initiated for the first service, respective transmit power for one or more messages of the RA procedure may be estimated based at least in part on parameter settings for the first service. The method may further comprise transmitting the one or more messages to a network node during the RA procedure by using the respective transmit power.

In an exemplary embodiment, the estimation of the respective transmit power for the one or more messages of the RA procedure based at least in part on the parameter settings for the first service may comprise: determining at least one power boost parameter for the one or more messages according to the parameter settings for the first service; and calculating the respective transmit power for the one or more messages based at least in part on the at least one power boost parameter.

According to a second aspect of the present disclosure, there is provided an apparatus. The apparatus may comprise one or more processors and one or more memories comprising computer program codes. The one or more memories and the computer program codes may be configured to, with execution of the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise a determining module, an estimating module and a transmitting module. In accordance with some exemplary embodiments, the determining module may be operable to carry out at least the determining step of the method according to the first aspect of the present disclosure. The estimating module may be operable to carry out at least the estimating step of the method according to the first aspect of the present disclosure. The transmitting module may be operable to carry out at least the transmitting step of the method according to the first aspect of the present disclosure.

According to a fifth aspect of the present disclosure, there is provided a method implemented at a radio device. The radio device may comprise a network node. The method may comprise configuring parameter settings for a first service and a second service. The first service may require a more reliable RA than the second service. The method may further comprise transmitting the parameter settings to a terminal device. According to an exemplary embodiment, the parameter settings may enable the terminal device to perform different transmit power estimations for a message of a RA procedure according to whether the RA procedure is initiated for the first service or the second service.

In an exemplary embodiment, the method according to the fifth aspect of the present disclosure may further comprise receiving one or more messages from the terminal device during the RA procedure initiated for the first service.

According to a sixth aspect of the present disclosure, there is provided an apparatus. The apparatus may comprise one or more processors and one or more memories comprising computer program codes. The one or more memories and the computer program codes may be configured to, with execution by the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a configuring module and a transmitting module. In accordance with some exemplary embodiments, the configuring module may be operable to carry out at least the configuring step of the method according to the fifth aspect of the present disclosure. The transmitting module may be operable to carry out at least the transmitting step of the method according to the fifth aspect of the present disclosure.

Optionally, the apparatus according to the eighth aspect of the present disclosure may further comprise a receiving module. In accordance with some exemplary embodiments, the receiving module may be operable to carry out at least the receiving step of the method according to the fifth aspect of the present disclosure.

In accordance with some exemplary embodiments, the parameter settings may cause the respective transmit power for the one or more messages for the first service to be boosted compared to the second service. For example, the one or more messages may comprise at least one of a preamble of physical random access channel (PRACH) and message 3.

In accordance with some exemplary embodiments, the parameter settings may indicate at least one of the following power parameters: a higher initial received target power of a preamble of PRACH for the first service than for the second service; a larger power ramping factor for the preamble of PRACH for the first service than for the second service; and a larger maximum number of preamble transmission of PRACH for the first service than for the second service.

In accordance with some exemplary embodiments, the parameter settings may indicate at least one of the following power parameters: a first increment of an initial received target power of a preamble of PRACH for the first service relative to the second service; a second increment of a power ramping factor for the preamble of PRACH for the first service relative to the second service; and a third increment of a maximum number of preamble transmission of PRACH for the first service relative to the second service.

In accordance with some exemplary embodiments, the parameter settings may indicate a fourth increment of transmit power for message 3 for the first service relative to the second service. Alternatively or additionally, the parameter settings may indicate to use one or more power parameters for a preamble of PRACH for the first service to calculate a fifth increment of transmit power for message 3 for the first service relative to the second service.

In accordance with some exemplary embodiments, the parameter settings may be obtained from the network node or predefined at the radio device such as a terminal device.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" refers to a network following any suitable communication standards, such as long term evolution-advanced (LTE-A), LTE, wideband code division multiple access (WCDMA), high-speed packet access (HSPA), and so on. Furthermore, the communications between a terminal device and a network node in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network node" refers to a network device in a wireless communication network via which a terminal device accesses to the network and receives services therefrom. The network device refers to a base station (BS), an access point (AP), multi-cell/multicast coordination entity (MCE), a gateway, a server, a controller or any other suitable device in the wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to the wireless communication network or to provide some service to a terminal device that has accessed to the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an internet of things (IoT) scenario, a terminal device may represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

In this disclosure, a radio device may be a network node or a terminal device. That is, a method proposed according to the disclosure can be implemented at a network node or a terminal device, to which the power control enhancement for RA may be applicable.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described previously, various types of services, such as URLLC, eMBB and mMTC, may be supported by NR via a common network. Different services have different reliability and latency requirements. Compared to the eMBB and mMTC services, the URLLC service is more reliable and delay sensitive.

A RA procedure may be initiated to establish a session for a specific service. RA may impact the user experience since one significant part of the latency introduced during communications is the latency of the RA. Many differentiated RA configurations with respect to delay sensitivity of services may be applied in a communication system. For instance, reconfiguration of numerology/transmission time interval (TTI) duration during RA may be performed to speed up the RA procedure for some services. As another example, a smaller backoff window size may be used to initiate the next RA procedure earlier when the previous RA procedure fails. Alternatively, PRACH resource partition may be used to reduce the PRACH collision probability for the URLLC service.

In addition to the schemes mentioned above, the power control strategy used during the RA procedure could also impact the success rate of RA. For example, according to the power control strategy applied for PRACH in LTE, the transmit power of a preamble of PRACH can be calculated by using a parameter PREAMBLE_RECEIVED_TARGET_POWER, which represents the target received power of the preamble and may be set as follows:

$$\text{PREAMBLE\_RECEIVED\_TARGET\_POWER} = \text{preambleInitialReceivedTargetPower} + \text{DELTA\_PREAMBLE} + (\text{PREAMBLE\_TRANSMISSION\_COUNTER} - 1) * \text{powerRampingStep} \qquad (1)$$

where preambleInitialReceivedTargetPower represents the initial preamble power, DELTA_PREAMBLE represents a preamble format based offset, PREAMBLE_TRANSMISSION_COUNTER represents a counter for preamble transmission, and powerRampingStep represents a power ramping factor. It is noted that higher PREAMBLE_RECEIVED_TARGET_POWER means the relative higher transmit power of the preamble.

Then the RA procedure may be performed by instructing the physical layer to transmit a preamble using the selected PRACH, the corresponding random access-radio network temporary identifier (RA-RNTI), preamble index and PREAMBLE_RECEIVED_TARGET_POWER.

If no RA response is received within the RA response window, or if none of all received RA responses contains a RA preamble identifier corresponding to the transmitted RA preamble, the RA response reception is considered not successful and the media access control (MAC) entity may take some appropriate actions.

For example, if the notification of power ramping suspension has not been received from lower layers, PREAMBLE_TRANSMISSION_COUNTER may be increased by 1.

If PREAMBLE_TRANSMISSION_COUNTER=preambleTransMax+1, and the RA preamble is transmitted on the secondary primary cell (SpCell) in dual connectivity case, a RA problem may be indicated to upper layers, where preambleTransMax represents the maximum number of preamble transmission. If the RA preamble is transmitted on the secondary cell (SCell), then the RA procedure is considered unsuccessfully completed.

If in this RA procedure the RA preamble was selected by MAC, then based on the backoff parameter, a random backoff time may be selected according to a uniform distribution between 0 and the backoff parameter value. The subsequent RA transmission may be delayed by the backoff time.

Some radio resource control (RRC) information element may be used to configure the generic RA parameters. For example, the information element RACH-ConfigCommon may be used to specify the generic RA parameters, such as preambleInitialReceivedTargetPower, PREAMBLE_TRANSMISSION_COUNTER, powerRampingStep and preambleTransMax. These parameters may impact the PRACH transmit power settings.

If the same power control parameter settings are applied to a preamble of PRACH (which may also be referred to as message 1) or message 3 for all services, the radio connection setup of the URLLC service may experience the same large delay as the eMBB/mMTC services.

Taking the advantage of the flexibility of power control makes it possible to ensure the reliability of RA traffics, for example, by enhancing transmit power for specific services. In the proposed solution according to some exemplary embodiments of the present disclosure, a special transmit power boost may be applied for RA message transmissions by a terminal device for some specified services, so that the RA delay for the specified services can be reduced.

Figure 1:
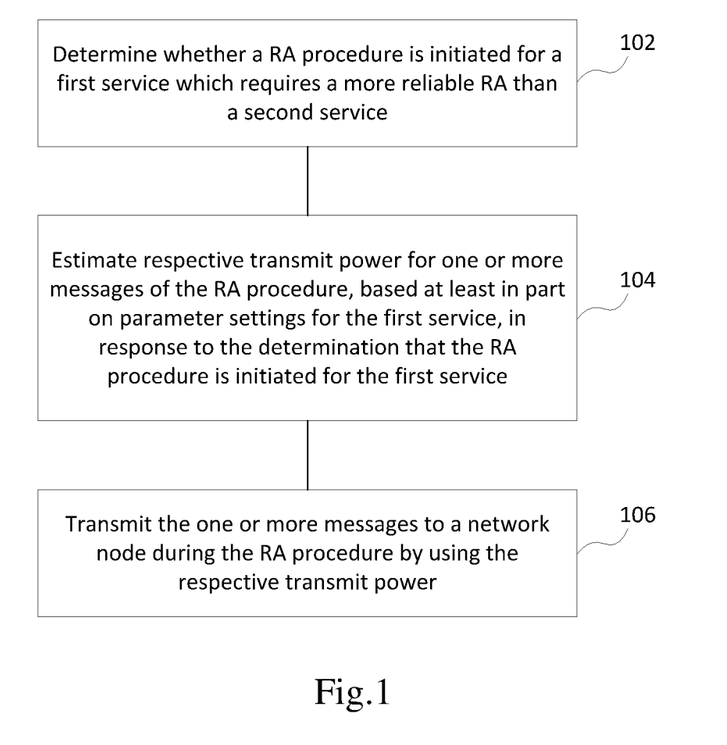
FIG. 1 is a flowchart illustrating a method according to some embodiments of the present disclosure.

FIG. 1 is a flowchart illustrating a method according to some embodiments of the present disclosure. The method illustrated in FIG. 1 may be performed by an apparatus implemented at a terminal device or communicatively coupled to a terminal device. In accordance with the exemplary embodiment, the terminal device may comprise a UE, a mobile station, a wireless device, a PDA, a laptop computer, a tablet computer, a smart phone, a portable device, or any other user device being capable of participating in communication of a wireless network.

According to the exemplary method illustrated in FIG. 1, a radio device such as a terminal device may determine whether a RA procedure is initiated for a first service at block 102. The first service such as URLLC service may require a more reliable RA than a second service such as eMBB service or mMTC service. It will be appreciated that although some embodiments are described in connection with URLLC, eMBB and mMTC services, the method according to the embodiment of the present disclosure may also be applicable to any other suitable service, traffic or session for which a RA procedure may be initiated.

In response to the determination that the RA procedure is initiated for the first service, the terminal device may estimate respective transmit power for one or more messages of the RA procedure at block 104, based at least in part on parameter settings for the first service. The parameter settings may indicate one or more parameters related to power control, certain power control strategies or rules for the RA procedure, and/or the like.

At block 106, the terminal device may transmit the one or more messages to a network node during the RA procedure by using the respective transmit power as estimated at block 104. In an exemplary embodiment, the one or more messages may comprise at least one of a preamble of PRACH and message 3.

It is noted that the exemplary illustrations of the one or more messages are not limited to the preamble of PRACH, message 1 and message 3 in the context of NR and LTE, but may comprise other RA messages. The proposed methods, apparatus and related products herein may also be applicable to other suitable network environments, for example, various wireless communication systems which can support RA message transmissions for different types of sessions or services, although some exemplary embodiments are described with respect to NR or LTE.

According to an exemplary embodiment, the parameter settings as described in connection with FIG. 1 may cause the respective transmit power for the one or more messages for the first service to be boosted compared to the second service. Boosting the transmit power of a specific message means increasing the original transmit power of this message by a predefined amount.

For example, the parameter settings may indicate or specify at least one power boost parameter for a type of service, thereby achieving an increase of transmit power of a RA message for this type of service. The power boost parameter may comprise a target value of transmit power, or a relative boost value for transmit power.

In accordance with the exemplary method illustrated in FIG. 1, the estimation of the respective transmit power for the one or more messages of the RA procedure based at least in part on the parameter settings for the first service may comprises: determining at least one power boost parameter for the one or more messages according to the parameter settings for the first service; and calculating the respective transmit power for the one or more messages based at least in part on the at least one power boost parameter.

According to an exemplary embodiment, the parameter settings may be obtained from the network node or predefined at the terminal device. For example, the network node may transmit the parameter settings to the terminal device through broadcasting signals and/or upon registration of the terminal device to the network node.

Figure 2:
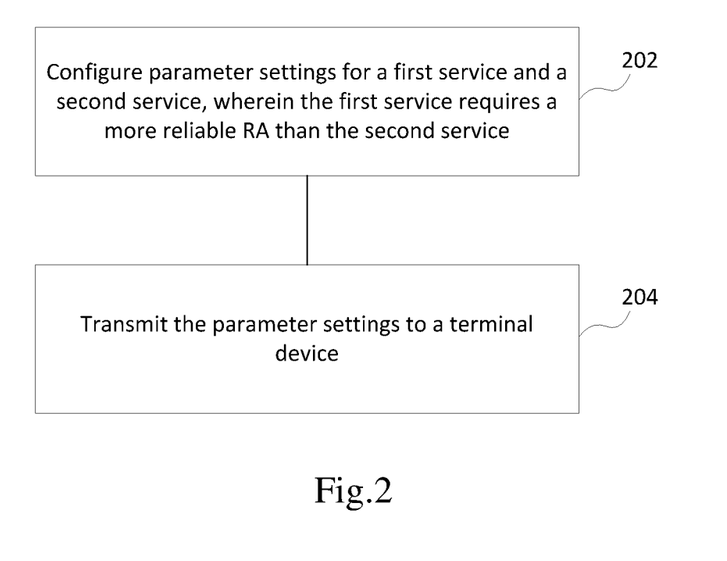
FIG. 2 is a flowchart illustrating another method according to some embodiments of the present disclosure.

FIG. 2 is a flowchart illustrating another method according to some embodiments of the present disclosure. The method illustrated in FIG. 2 may be performed by an apparatus implemented at a network node or communicatively coupled to a network node. In accordance with the exemplary embodiment, the network node may comprise a gNB, an eNB, a BS, an AP, a communication node, a control center, a relay station, a repeater, or any other network device being capable of participating in communication of a wireless network.

In accordance with the exemplary method illustrated in FIG. 2, the network node may configure parameter settings for a first service and a second service, as shown in block 202. As described in connection with FIG. 1, the first service requires a more reliable RA than a second service. For example, the first service may comprise the URLLC service or any other service having tight requirements with respect to reliability and/or delay.

According to an exemplary embodiment, the network node may use some system information elements to configure the parameter settings. For example, a specified RRC information element such as RACH-ConfigCommon may be used to inform a terminal device of certain RA parameters indicated by the configured parameter settings.

At block 204, the network node may transmit the parameter settings to a terminal device. For example, the parameter settings may be transmitted to the terminal device via broadcasting signals, registration signals and/or the like. According to an exemplary embodiment, the parameter settings may enable the terminal device to perform different transmit power estimations for a message of a RA procedure according to whether the RA procedure is initiated for the first service or the second service.

Accordingly, the terminal device obtaining the parameter settings from the network node may perform power control enhancement for uplink RA in accordance with the exemplary method illustrated in FIG. 1. Optionally, the network node may receive one or more messages from the terminal device during the RA procedure initiated for the first service. The parameter settings may cause respective transmit power for the one or more messages for the first service to be boosted compared to the second service.

In an exemplary embodiment, the parameter settings may enable to realize a transmit power boost of a preamble of PRACH for the terminal device with the first service. A possible way to increase the transmit power of the preamble is to boost the value of PREAMBLE_RECEIVED_TARGET_POWER.

For example, the parameter settings may indicate at least one of the following power parameters: a higher initial received target power of a preamble of PRACH for the first service than for the second service; a larger power ramping factor for the preamble of PRACH for the first service than for the second service; and a larger maximum number of preamble transmission of PRACH for the first service than for the second service.

In this regard, new values of preambleInitialReceivedTargetPower and powerRampingStep may be specified for the first service such as URLLC service, so as to differentiate the RA power control of the first service from the second service such as eMBB or mMTC service. For example, some new parameters may be introduced in RACH-ConfigCommon to boost PRACH transmit power for a terminal device with URLLC service, such as preambleInitialReceivedTargetPowerUrllc, powerRampingStepUrllc, preambleTransMaxUrllc and/or the like. Correspondingly, the original parameters preambleInitialReceivedTargetPower, powerRampingStep and preambleTransMax are applied to a terminal device with eMBB or mMTC service.

Compared to the original parameters defined in the conventional wireless communication network such as LTE, the preambleInitialReceivedTargetPowerUrllc is larger than preambleInitialReceivedTargetPower, powerRampingStepUrllc is larger than powerRampingStep, and preambleTransMaxUrllc is larger than preambleTransMax. The higher PREAMBLE_RECEIVED_TARGET_POWER calculated for the URLLC service using one or more new parameters means relative higher transmit power of the preamble.

Alternatively, the parameter settings as described in combination with FIG. 1 and FIG. 2 may indicate at least one of the following power parameters: a first increment of an initial received target power of a preamble of PRACH for the first service relative to the second service; a second increment of a power ramping factor for the preamble of PRACH for the first service relative to the second service; and a third increment of a maximum number of preamble transmission of PRACH for the first service relative to the second service.

In this regard, some new parameters may be specified for the first service such as URLLC service to indicate the relative power boost. For example, the first increment may be denoted as deltaPreambleInitialReceivedTargetPowerUrllc (>0 dB), the second increment may be denoted as deltaPowerRampingStepUrllc (>0 dB), and the third increment may be denoted as deltapreambleTransMaxUrllc (>0 dB). The new parameters may be specified in RACH-ConfigCommon from the network node to boost PRACH transmit power for a terminal device with URLLC service. Alternatively or additionally, these parameters may also be predefined at the terminal device to save the signaling overhead.

Accordingly, the terminal device can determine one or more boost parameters for the PRACH transmission using the following equations:

$$\text{preambleInitialReceivedTargetPowerUrllc} = \text{preambleInitialReceivedTargetPower} + \text{deltaPreambleInitialReceivedTargetPowerUrllc} \quad (2)$$

$$\text{powerRampingStepUrllc} = \text{powerRampingStep} + \text{deltaPowerRampingStepUrllc} \quad (3)$$

$$\text{preambleTransMaxUrllc} = \text{preambleTransMax} + \text{deltapreambleTransMaxUrllc} \quad (4)$$

In addition to a power boost for PRACH, it is also meaningful to apply a power boost for message 3 transmission for URLLC service. For example, at a PRACH collision between a first UE with URLLC service and a second UE with eMBB service, there may be a high probability that both UEs will send message 3 according to the same RA response from the gNB. If the first UE applies a power boost for message 3 transmission, there is still a high probability that the gNB successfully detects the message 3 from the first UE even though there is a message 3 collision between the first UE and the second UE.

Thus, according to an exemplary embodiment, a message 3 power boost may be enabled for the terminal device with the first service which requires a more reliable RA than the second device. For example, the parameter settings may indicate a fourth increment of transmit power for message 3 for the first service relative to the second service. Alternatively, the parameter settings may indicate to use one or more power parameters for a preamble of PRACH for the first service to calculate a fifth increment of transmit power for message 3 for the first service relative to the second service.

Correspondingly, there may be two options to boost the transmit power of message 3 for a UE with URLLC service. In Option I, a power boost may be achieved by predefining an offset (>0 dB) as the fourth increment for message 3 transmission for a UE with URLLC service. The UE can firstly calculate the transmit power according to the normal power control schemes such as those applied in LTE. Then the UE can estimate the transmit power for message 3 by increasing the calculated transmit power with the predefined offset.

In Option II, if one or more power boost parameters are preconfigured or predefined for PRACH, these parameters may be reused to calculate a transmit power boost for message 3. For example, the UE can calculate one of offset1 to offset4 using the following equations as the fifth increment to estimate the transmit power for message 3.

$$\text{offset1} = \text{preambleInitialReceivedTargetPowerUrllc} - \text{preambleInitialReceivedTargetPower} \quad (5)$$

$$\text{offset2} = (\text{PREAMBLE\_TRANSMISSION\_COUNTER} - 1) * (\text{powerRampingStepUrllc} - \text{powerRampingStep}) \quad (6)$$

$$\text{offset3} = \text{DeltaPreambleInitialReceivedTargetPowerUrllc} \quad (7)$$

$$\text{offset4} = (\text{PREAMBLE\_TRANSMISSION\_COUNTER} - 1) * \text{deltaPowerRampingStepUrllc} \quad (8)$$

It will be realized that the power boost parameters and the parameter settings described herein are just examples. Other suitable parameter settings, the associated power boost parameters and the specific values thereof may also be applicable to implement the proposed methods.

Figure 3:
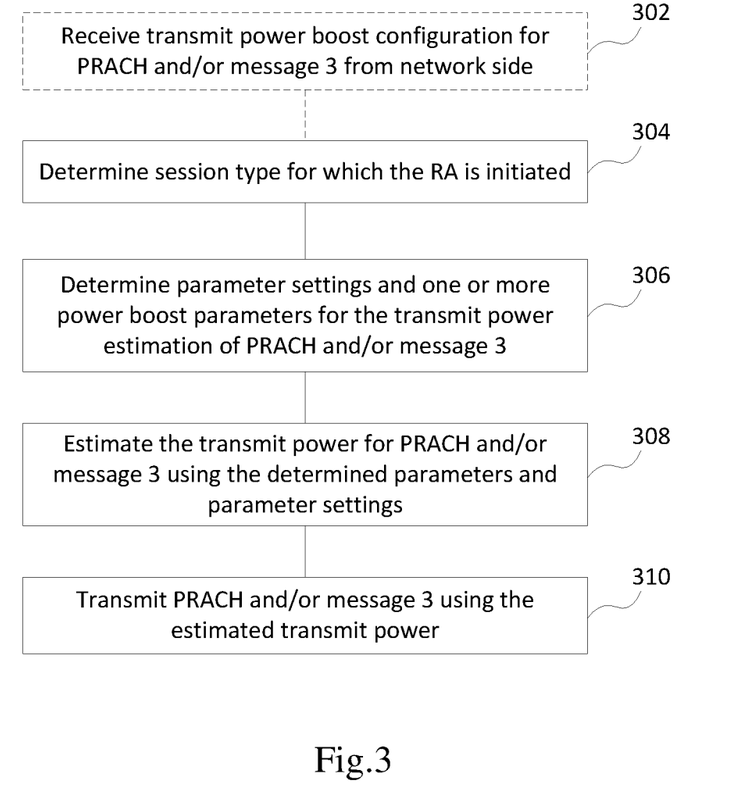
FIG. 3 is a flowchart illustrating a method for implementing power control enhancement for RA according to an embodiment of the present disclosure.

FIG. 3 is a flowchart illustrating a method for implementing power control enhancement for RA according to an embodiment of the present disclosure. In the illustrated method, a UE may apply a transmission power boost to a preamble of PRACH (or simply "PRACH" for short) and/or message 3 based at least in part on the type of a session for which a RA is initiated. Different services may correspond to different session types. In the typical case, the session type may be determined by the priority of the logical channel that has data for transmission.

As shown in block 304 of FIG. 3, when a UE has a session request in RA, the high protocol layer of the UE can determine the session type (such as URLLC, eMBB or mMTC) for which the RA is initiated. An indicator of the determined session type may be sent from the high protocol layer of the UE to the MAC layer. At block 306, the MAC layer can determine parameter settings and one or more power boost parameters for the transmit power estimation of PRACH and/or message 3 according to the indicator.

In an exemplary embodiment, the parameter settings and the power boost parameters for the transmit power estimation can be determined or obtained from the transmit power boost configuration for PRACH and/or message 3. Such transmit power boost configuration may be received by the UE from the network side, as shown in the optional block 302 of FIG. 3. Alternatively or additionally, the UE also can retrieve the predefined parameter settings and/or the predefined power boost parameters locally.

At block 308, the MAC layer of the UE can estimate the transmit power for PRACH and/or message 3 using the determined parameters and parameter settings. Then the transmission of PRACH or message 3 can be scheduled during the RA procedure in the air interface. Accordingly, the UE can transmit PRACH and/or message 3 using the estimated transmit power, as shown in block 310.

The proposed methods as illustrated with respect to FIGS. 1-3 can enhance the transmission power control for PRACH and/or message 3 by a terminal device for a more reliable service in RA, so as to increase the RA success rate and reduce the RA delay for this service.

For example, according to the proposed methods, a transmit power boost may be applied for uplink RA message transmissions by a UE with URLLC service, so that the UE with URLLC service can access to the system with short delay compared to a UE with eMBB/mMTC service. In an exemplary embodiment, a power boost may be applied to the PRACH for the UE with URLLC service, so that the gNB can detect the PRACH from the UE with a higher probability. Alternatively or additionally, the transmit power for message 3 of the UE with URLLC service may also be boosted, so that there is a higher probability for the gNB to detect message 3 from the UE with URLLC service at a collision with another UE with eMBB/mMTC service.

It is noted that in a two-step RA procedure, a power boost for new message 1 transmission as an aggregated PRACH and message 3 transmission may be applied for URLLC service. Accordingly, the above illustrated embodiments of a network node for parameter settings configuration and transmission, and a terminal device for service type determination, transmit power estimation and RA message transmission may be applicable to the two-step RA procedure in a similar way. In this case, a RA response message as a contention resolution message from the network node acting as a receiver of the new message 1 can be sent to the terminal device acting as a RA initiator.

The various blocks shown in FIGS. 1-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 4:
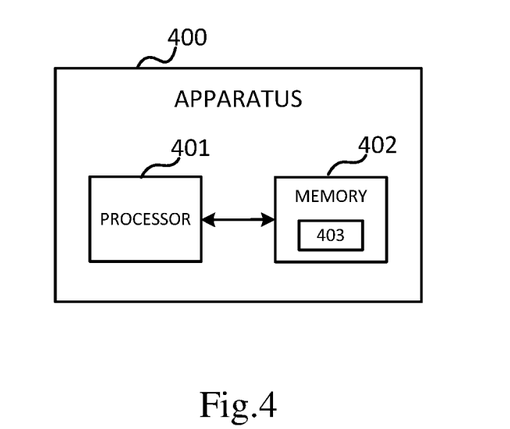
FIG. 4 is a block diagram illustrating an apparatus according to various embodiments of the present disclosure.

FIG. 4 is a block diagram illustrating an apparatus 400 according to various embodiments of the present disclosure. As shown in FIG. 4, the apparatus 400 may comprise one or more processors such as processor 401 and one or more memories such as memory 402 storing computer program codes 403. The memory 402 may be non-transitory machine/processor/computer readable storage medium. In accordance with some exemplary embodiments, the apparatus 400 may be implemented as an integrated circuit chip or module that can be plugged or installed into a terminal device as described with respect to FIG. 1, or a network node as described with respect to FIG. 2.

In some implementations, the one or more memories 402 and the computer program codes 403 may be configured to, with the one or more processors 401, cause the apparatus 400 at least to perform any operation of the method as described in connection with FIG. 1. In other implementations, the one or more memories 402 and the computer program codes 403 may be configured to, with the one or more processors 401, cause the apparatus 400 at least to perform any operation of the method as described in connection with FIG. 2. Alternatively or additionally, the one or more memories 402 and the computer program codes 403 may be configured to, with the one or more processors 401, cause the apparatus 400 at least to perform more or less operations to implement the proposed methods according to the exemplary embodiments of the present disclosure.

Figure 5:
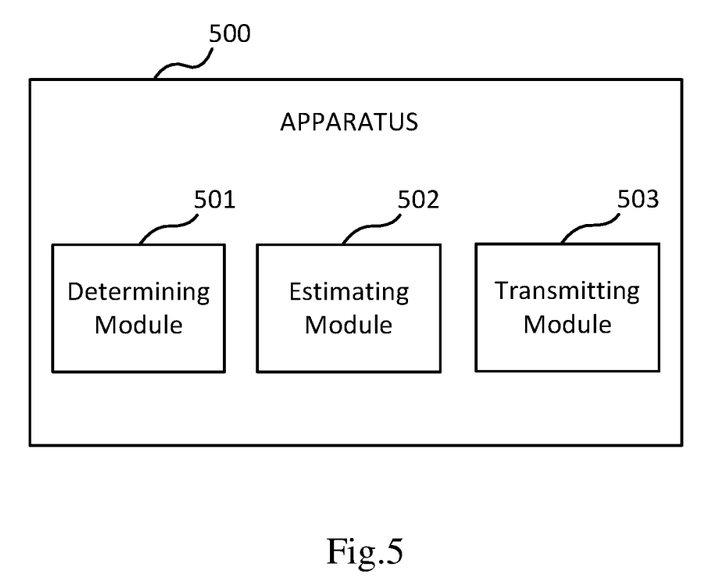
FIG. 5 is a block diagram illustrating another apparatus according to some embodiments of the present disclosure.

FIG. 5 is a block diagram illustrating an apparatus 500 according to some embodiments of the present disclosure. As shown in FIG. 5, the apparatus 500 may comprise a determining module 501, an estimating module 502 and a transmitting module 503. In an exemplary embodiment, the apparatus 500 may be implemented at a terminal device. The determining module 501 may be operable to carry out the operation in block 102, the estimating module 502 may be operable to carry out the operation in block 104, and the transmitting module 503 may be operable to carry out the operation in block 106. Optionally, the determining module 501, the estimating module 502 and/or the transmitting module 503 may be operable to carry out more or less operations to implement the proposed methods according to the exemplary embodiments of the present disclosure.

Figure 6:
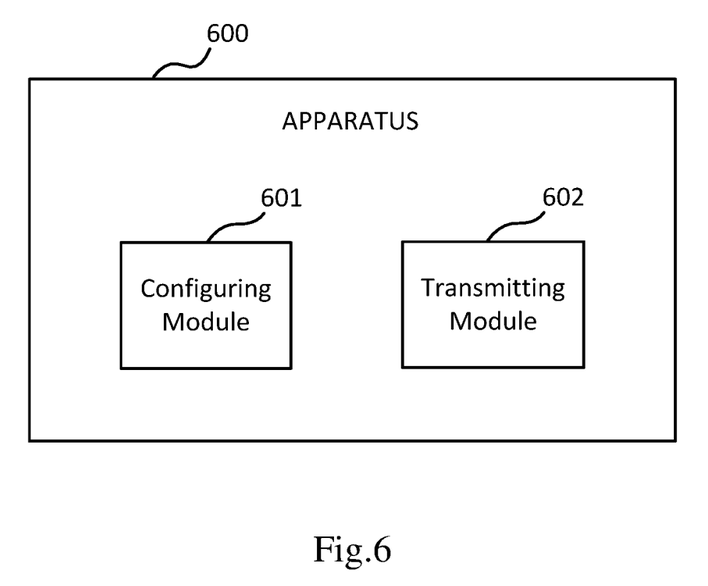
FIG. 6 is a block diagram illustrating yet another apparatus according to some embodiments of the present disclosure.

FIG. 6 is a block diagram illustrating an apparatus 600 according to some embodiments of the present disclosure. As shown in FIG. 6, the apparatus 600 may comprise a configuring module 601 and a transmitting module 602. In an exemplary embodiment, the apparatus 600 may be implemented at a network node. The configuring module 601 may be operable to carry out the operation in block 202, and the transmitting module 602 may be operable to carry out the operation in block 204. In an exemplary embodiment, the apparatus 600 may further comprise a receiving module (not shown in FIG. 6) which may be operable to receive one or more messages from a terminal device. Optionally, the configuring module 601, the transmitting module 602 and/or the receiving module may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method of operation by a terminal device with respect to a wireless communication network, the method comprising:
   receiving a radio resource control (RRC) configuration from a network node of the wireless communication network, wherein the RRC configuration includes a first set of power parameters for use by the terminal device when performing random access procedures for a first type of communication service, the first set of power parameters including a first power ramping step size, and further including at least one of a first received-power target for random access preambles and a first maximum transmit power for random access preambles, and wherein the RRC configuration includes a second set of power parameters for use by the terminal device when performing random access procedures for a second type of communication service, the second set of power parameters including a second power ramping step size, and further including at least one of a second received-power target for random access preambles and a second maximum transmit power for random access preambles; and
   performing a random access procedure towards the network node, for connecting to the network node to send uplink data, the random access procedure including:
      selecting between use of the first set of power parameters or the second set of power parameters, as a selected set of power parameters, in dependence on whether the uplink data is associated with the first type of communication service or the second type of communication service; and
      using the selected set of power parameters for performing the random access procedure, including using the selected power ramping step size to increase a transmission power of the terminal device when repeating a random access attempt within the random access procedure.

2. The method of claim 1, further comprising performing a further random access procedure towards the network node, for connecting to the network node to send further uplink data, including selecting the second power ramping step size to use for the further random access procedure, in dependence on determining that the further uplink data is associated with the second type of communication service, and using the second power ramping step size to increase a transmission power of the terminal device when repeating a random access attempt within the further random access procedure.

3. The method of claim 1, wherein the wireless communication network associates a higher priority to the second type of communication service in comparison to the first type of communication service, and wherein the second power ramping step size is larger than the first power ramping step size.

4. The method of claim 1, wherein the second type of communication service is an Ultra Reliable Low Latency Communication (URLLC) service.

5. A terminal device configured for operation with a wireless communication network, the terminal device comprising:
   radiofrequency circuitry configured for wirelessly communicating with the wireless communication network; and
   processing circuitry operatively associated with the radiofrequency circuitry and configured to:

receive a RRC configuration from a network node of the wireless communication network, the RRC configuration including a first set of power parameters for use when performing random access procedures for a first type of communication service, the first set of power parameters including a first power ramping step size, and further including a least one of a first received-power target for random access preambles and a first maximum transmit power for random access preambles, wherein the RRC configuration includes a second set of power parameters for use when performing random access procedures for a second type of communication service, the second set of power parameters including a second power ramping step size, and further including at least one of a second received-power target for random access preambles and a second maximum transmit power for random access preambles; and perform a random access procedure towards the network node, for connecting to the network node to send uplink data, the random access procedure including:

selecting between use of the first set of power parameters or the second set of power parameters, as a selected set of power parameters, in dependence on whether the uplink data is associated with the first type of communication service or the second type of communication service; and using the selected set of power parameters for performing the random access procedure, including using the selected power ramping step size to increase a transmission power of the terminal device when repeating a random access attempt within the random access procedure.

6. The terminal device of claim 5, wherein the processing circuitry is configured to perform a further random access procedure towards the network node, for connecting to the network node to send further uplink data, including selecting the second power ramping step size to use for the further random access procedure, in dependence on determining that the further uplink data is associated with the second type of communication service, and using the second power ramping step size to increase a transmission power of the terminal device when repeating a random access attempt within the further random access procedure.

7. The terminal device of claim 5, wherein the wireless communication network associates a higher priority to the second type of communication service in comparison to the first type of communication service, and wherein the second power ramping step size is larger than the first power ramping step size.

8. The terminal device of claim 5, wherein the second type of communication service is an Ultra Reliable Low Latency Communication (URLLC) service.

* * * * *

UNITED STATES PATENT AND TRADEMARK OFFICE
CERTIFICATE OF CORRECTION

PATENT NO. : 11,044,680 B2
APPLICATION NO. : 16/916717
DATED : June 22, 2021
INVENTOR(S) : Liu et al.

It is certified that error appears in the above-identified patent and that said Letters Patent is hereby corrected as shown below:

In the Specification

In Column 1, Line 7, delete "2019," and insert -- 2019, now abandoned, --, therefor.

Signed and Sealed this
Fourth Day of January, 2022

Drew Hirshfeld
*Performing the Functions and Duties of the
Under Secretary of Commerce for Intellectual Property and
Director of the United States Patent and Trademark Office*